United States Patent [19]
Nakanishi

[11] Patent Number: 5,595,226
[45] Date of Patent: Jan. 21, 1997

[54] DRILLING/CUTTING MACHINE FOR MAKING JOINTS IN WOODEN MEMBERS

[75] Inventor: Teruo Nakanishi, Kyoto, Japan

[73] Assignee: Nakanishi Construction Company, Japan

[21] Appl. No.: 274,825

[22] Filed: Jul. 14, 1994

Related U.S. Application Data

[63] Continuation-in-part of Ser. No. 263,338, Jun. 21, 1994, Pat. No. 5,499,667.

[30] Foreign Application Priority Data

Jul. 14, 1993 [JP] Japan ...................... 5-173933

[51] Int. Cl.⁶ ........................................ B27F 5/00
[52] U.S. Cl. .................. 144/69; 144/78; 144/84; 144/92; 144/218; 144/240; 144/365; 144/371; 144/2.1; 144/134.1; 144/136.1; 409/22; 409/125
[58] Field of Search .................. 408/22, 30, 125, 408/146; 144/2 R, 67, 68, 69, 74, 71, 78, 79, 82–84, 92, 136 R, 134 R, 134 A, 365, 371, 240, 241, 218

[56] References Cited

U.S. PATENT DOCUMENTS

| 482,242 | 9/1892 | Gisvold | 144/84 |
|---|---|---|---|
| 2,334,829 | 11/1943 | Mansfield | 144/78 |
| 2,821,218 | 1/1958 | Hultquist | 144/78 |
| 3,491,812 | 1/1970 | Butler | 144/78 |
| 4,112,986 | 9/1978 | Strange et al. | 144/136 R |
| 4,470,733 | 9/1984 | Marzques, Jr. | 144/240 |
| 4,742,856 | 5/1988 | Hehr et al. | 144/84 |
| 4,858,664 | 8/1989 | Wright | 144/136 R |

FOREIGN PATENT DOCUMENTS

13588 of 1851 United Kingdom ..................... 144/67

*Primary Examiner*—W. Donald Bray
*Attorney, Agent, or Firm*—Klima & Hopkins, P.C.

[57] ABSTRACT

A drilling/cutting machine for forming joints for accommodating metal protrusions of a metal plate connector. The machine can cut one or more joints simultaneously with a drilling/cutting bit that drills and simultaneously cuts smaller and larger width slots completing the joint.

14 Claims, 6 Drawing Sheets

DRILLING/CUTTING MACHINE FOR MAKING JOINTS IN WOODEN MEMBERS

RELATED PATENT APPLICATION

This is a continuation-in-part of U.S. patent application entitled "Drill/Cutting Bit, and Method of Making Structural Joint by Teruo Nakanishi, Ser. No. 08/263,339 filed on Jun. 21, 1994, now U.S. Pat. No. 5,499,667 herein fully incorporated by reference.

FIELD OF THE INVENTION

The present invention is directed to a drilling/cutting machine for making joints for receiving protrusions of a metal plate connector for connecting wooden members.

BACKGROUND OF THE INVENTION

Figure 8:
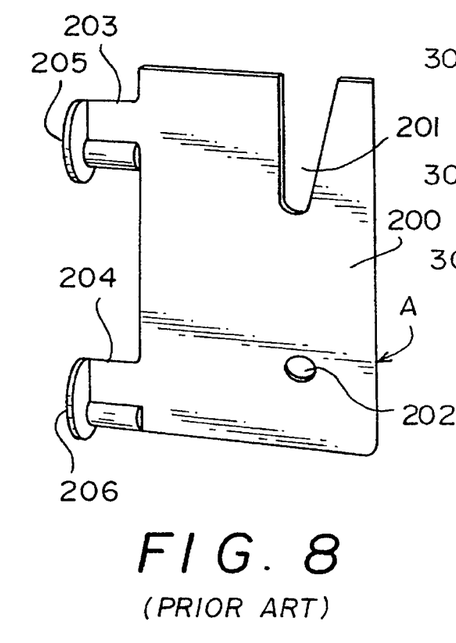
FIG. 8 is a perspective view of a prior art metal plate connector used with the joint according to the present invention.
Figure 9:
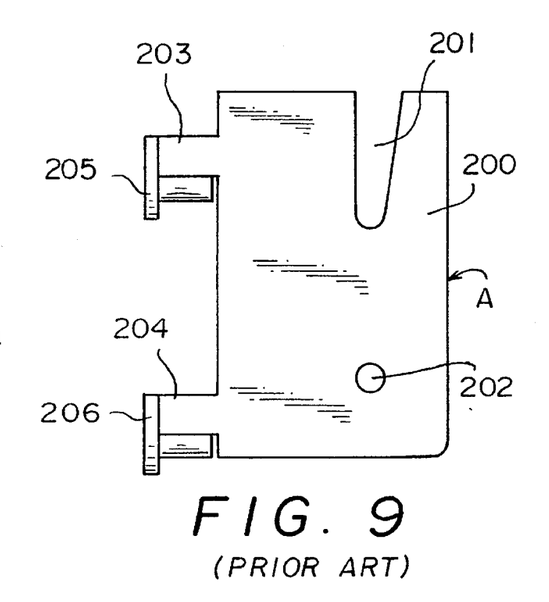
FIG. 9 is a side elevational view of the metal plate connector as shown in FIG. 8.
Figure 10:
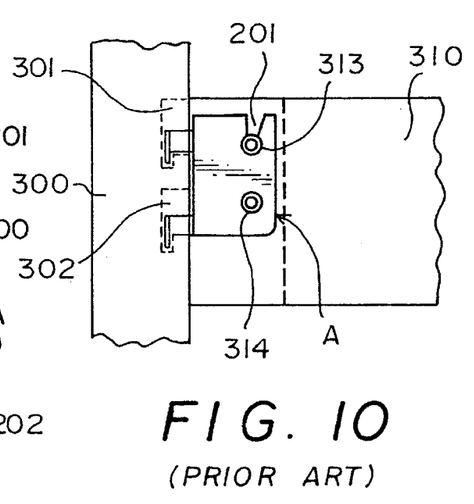
FIG. 10 is a side elevational view illustrating the connection between a column provided with a joint according to the present invention cooperating with a metal plate connector of a beam.

There are various woodworking methods employed in the construction of buildings with wooden members. As shown in FIGS. 8 to 10, a so called "metal fit" joint is illustrated using a metal plate connector A having a pair of metal protrusions 203 and 204. The "metal fit" joint is used for connecting a horizontal wooden member to a vertical wooden member having a special slot to be discussed below. The metal protrusions 203 and 204 are provided with end plates 205 and 206, respectively. The end plates 205 and 206 can be attached, for example, by welding. The metal plate 200 is provided with a hole 202 and a U-shaped slot 201 for connecting the metal plate 200 to the horizontal wooden member with fasteners.

The method of forming the joint is illustrated in FIGS. 9 and 10. The horizontal member or beam 310 is connected to the metal plate connector A by bolts 313 and 314. The beam 310 also has an end slit at its end (not shown) for accommodating the metal plate connector A.

The metal protrusions 203 and 204 have welded end plates 205 and 206, respectively, which are received in joints 301 and 302 of the wooden member or column 300, as shown in FIG. 10.

Once the metal protrusions 203 and 204 are fully fitted into the joints 301 and 302, the metal plate connector A is hit downwardly with an appropriate tool to set the metal plate connector A firmly in the column 300, as shown in FIG. 10.

As shown in FIG. 10, a pin 313 having a D-shaped cross section is inserted through the beam 310 and metal plate connector A. The beam 310 is then moved in a direction until the end grain of the beam 310 meets the column 300 completely.

The beam 310 is then pushed down from its upper side until the pin 313 registers with the bottom of slot 201, as shown in FIG. 10. The beam 310 is further forced downwardly with appropriate pressure, and the pin 314 is inserted through the beam 310 and metal plate connector A. Nuts are threaded onto and tightened on the pins 313 and 314.

In order to use the metal plate connector A to connect the beam 310 to the column 300, it is necessary to provide joints 301 and 302 in the column 300.

Figure 11:
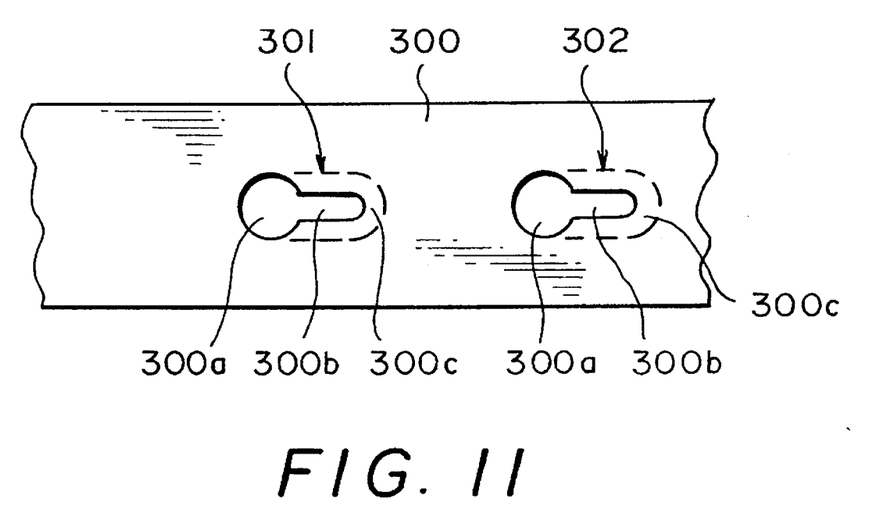
FIG. 11 is a plan view of a lengthwise joint according to the present invention.

The joints 301 and 302 are made by first drilling holes 300a in the column 300. Top plan view of the holes 300a are shown in FIG. 11. Here, the pair of holes 300a are drilled in the column 300 with a standard drill bit. Secondly, smaller width slots 300b are made extending from the holes 300a with a rotary cutting bit. Thirdly, larger width slots 300c are made extending from the holes 300a with a different rotary bit.

Thus, the holes 300a having cylinder shaped cross sections, slots 300b have rectangular shaped cross sections, and slots 300c have rectangular shaped cross sections. The slots 300c are positioned just beneath the slots 300b.

In order to make joints 301 and 302, three (3) different types of drills or cutting tools are required. Specifically, the tools required are as follows:

1. a first cutting bit for making holes 300a having a cylindrical shaped cross section and oriented substantially perpendicular to the surface of the wooden column;
2. a second cutting bit for making the small width slots 300b extending from the holes 300a. The smaller width slots 300b are cut to have a first predetermined depth extending downwardly from the surface of the wooden column; and
3. a third cutting bit for making the larger width slots 300c extending from the holes 300a. The larger width slots 300c are cut to have a second predetermined depth extending from the bottom of the smaller width groove deeper into the wooden column.

As explained above, such drilling method requires three (3) different tools including a twist drill bit, a flat drill bit and a rotary side cutting bit. To make highly accurate holes and slots, it is required that the bits be change for each cut. This requires exact setting of the drill at appropriate marks as well as setting the exact moving distance and direction of the drill. Thus, the conventional method takes a significant amount of time, and is troublesome due to the requirement of exchanging the bits, and time and trouble associated with setting the drill for accuracy with each different bit.

SUMMARY OF THE INVENTION

Thus, an object of the present invention is to provide a combined drilling/cutting machine for making joints according to the present invention.

Another object of the present invention is to provide a combined drill/cutting machine for cutting a hole, smaller width slot, and a larger width slot.

A further object of the present invention is to provide a combined drill/cutting machine comprising a stationary base for supporting a wooden member; a drilling/cutting tool connected to said base; a device for moving said drilling/cutting tool towards and away from said base; a device for clamping and conveying the wooden member relative to said drilling/cutting tool and said base; and a drilling bit connected to said drilling tool, said drilling bit, including, a shank, a body connected to said shank, said body having at least one primary groove with a trailing cutting edge extending along a longitudinal direction of said body for cutting a smaller width groove, and an end cutting blade positioned at an end of said body, said end cutting blade having a bottom cutting edge for boring a hole and a side cutting edge for cutting a larger width groove.

These and other objects of the present invention can be accomplished by the present invention.

The drill/cutting machine according to the present invention is for cutting joints in a wooden member for accepting a metal plate connector for connecting wooden members together. The joint is typically cut in a vertical member or column and cooperates with a connector attached to a horizontal member or beam. However, this same joint can be used in a variety of other applications for joining together various wooden members.

The joint cut in the column receives one or more protrusions of the metal plate connector attached to the beam. The joint is cut with the drill/cutting machine including a drill/cutting bit comprising a shank, a body having at least one groove with a trailing cutting edge for cutting the smaller width slot and an end cutting blade having a bottom cutting edge for boring the hole and a side cutting edge for cutting the larger width slot.

The method according to the present invention involves using a drill/cutting machine according to the present invention. Firstly, the drill/cutting bit is connected to the drilling/cutting machine, and the wooden member is loaded onto the base of the machine. Secondly, the drilling/cutting tool of the machine is moved towards the wooden member to bore a hole in the wooden member. Thirdly, the drill/cutting tool of the machine is moved sideways from the hole a predetermined distance to simultaneously cut the lesser width groove and the larger width groove.

Figure 12:
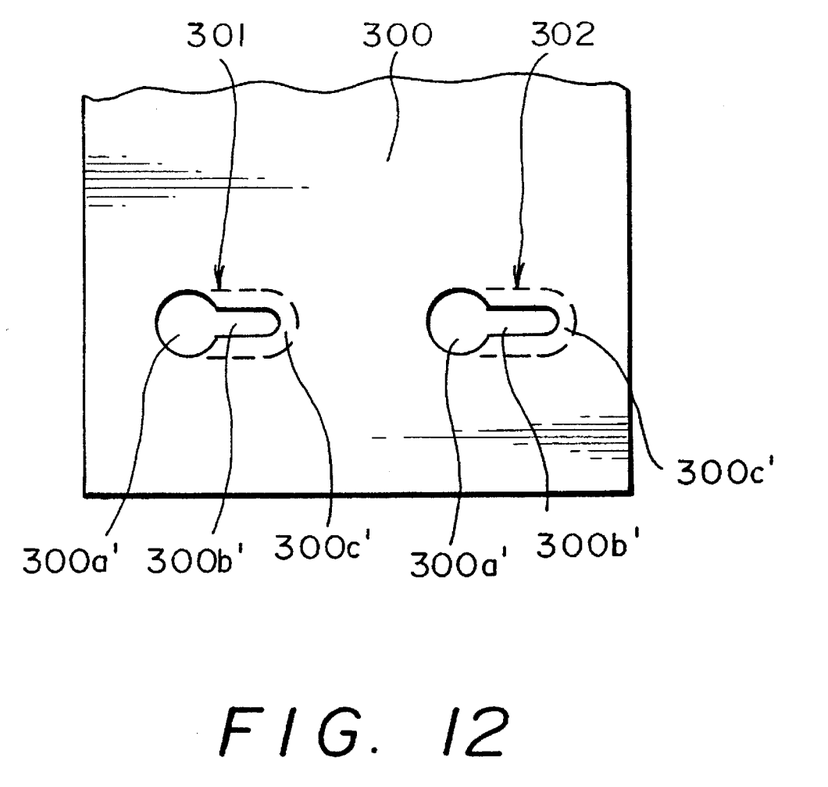
FIG. 12 is a plan view of a crosswise joint according to the present invention.

In order to drill holes to insert the protrusions of the metal plate connector, the following steps are performed:

1. set the pair of drilling/cutting tools of the machine at a predetermined distance dictated by the spacing between the metal protrusions of the metal plate connector to be used;
2. set the base to align the wooden member relative to the pair of drilling/cutting bits (e.g. the wooden member is aligned lengthwise (FIG. 11) or sideways (FIG. 12)
3. start the machine causing the drilling/cutting tool to rotate the drilling/cutting bit, and move the drilling/cutting bit in contact with the wooden member to bore a cylindrical shaped hole (the drilling/cutting tool is set to drill a predetermined depth hole prior to this operation.
4. after forming the holes, the drilling/cutting tool is moved along the length of the wooden member to simultaneously cut the smaller width groove and the larger width groove. This completes the drilling of the joints.

As it is explained, by using the drilling/cutting machine have a pair of drilling/cutting tools set apart a predetermined distance, the two joints can be simultaneously made corresponding to the metal protrusions of the metal plate fitting A. Further, each drilling/cutting bit simultaneously cuts both the smaller and larger width slots of each joint. Thus, this combination of simultaneous cutting of joints and cutting two grooves simultaneously for each joint greatly increases the efficiency of making the complete joint.

The drilling/cutting machine can include a clamping device for securely holding the wooden member during the drilling and cutting operations for forming joints. Further, the clamping device can clamp different size width wooden members. In addition, the base and clamping device can be set so that the pair of joints form are oriented lengthwise or sideways relative to the wooden member.

BRIEF DESCRIPTION OF THE DRAWINGS

The invention will now be described by way of example with reference to the accompanying drawings which.

DETAILED DESCRIPTION OF THE PREFERRED EMBODIMENTS

Figure 1:
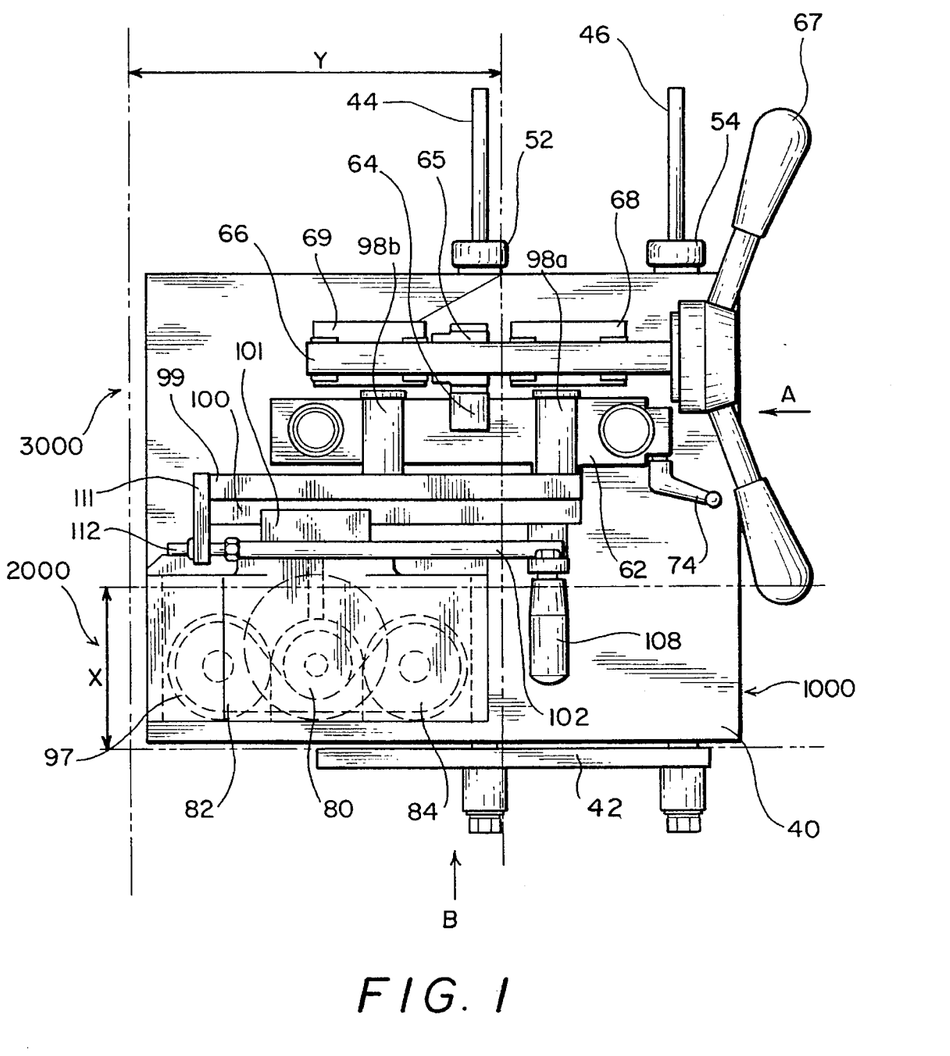
FIG. 1 is a top planar view of the drilling/cutting machine according to the present invention.

A preferred embodiment of the drilling/cutting machine according to the present invention is shown in FIG. 1. The main components of the machine includes a holding device 1000 for holding a wooden member to be processed, a drilling/cutting tool 2000, and a mechanism for raising/lowering the drilling/cutting tool 2000, and for sliding the drilling/cutting tool back-and-forth (e.g. horizontal movement is embodiment shown).

The holding device 1000 includes a bed 40 for supporting a wooden member. It is designed in a way that the wood member can be placed either lengthwise or crosswise when making the joints.

Figure 3:
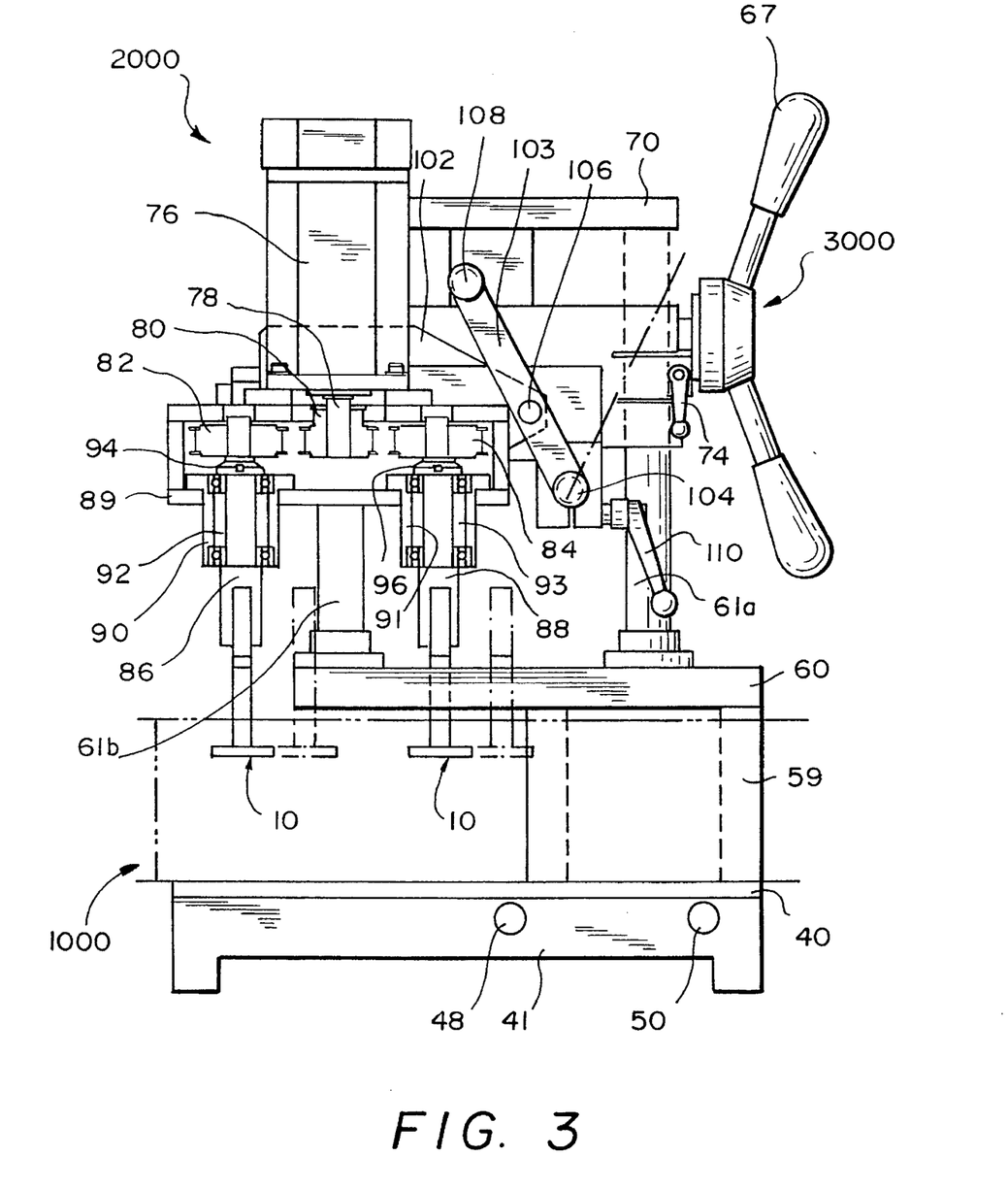
FIG. 3 another side elevational view of the drilling/cutting machine as indicated by arrow B in FIG. 1.
Figure 4:
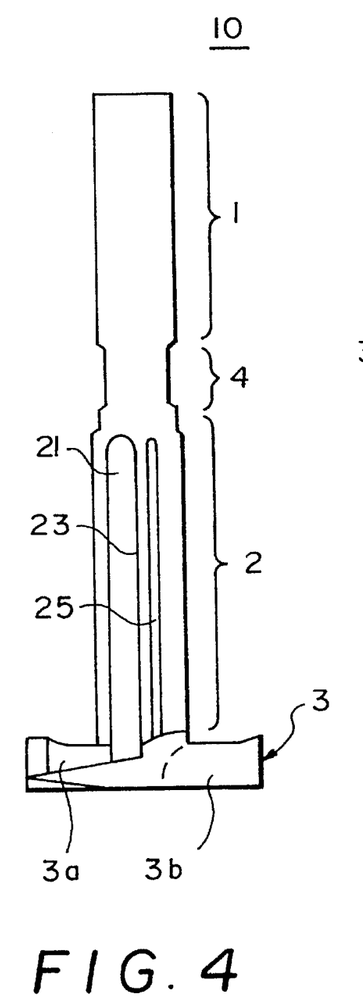
FIG. 4 is a side elevational view of the drilling/cutting bit according to the present invention.

In this embodiment, a lower base 41 supports bed 40 and a clamping plate 42, which clamps the wood member tightly. The clamping plate 42 is attached to shafts 44 and 46, which are received within sets of holes 48 and 50 in the lower base 41, as shown in FIG. 3. This arrangement allows for sliding movement of the clamping plate 42 via shafts 44 and 46 to allow adjustment of the clamping plate 42 to accommodate different size wooden members. The ends of the shafts 44 and 46 protruding from the lower base 41 are locked down by quick clamping knobs 52, 54 after adjustment of the clamping plate 42.

Figure 2:
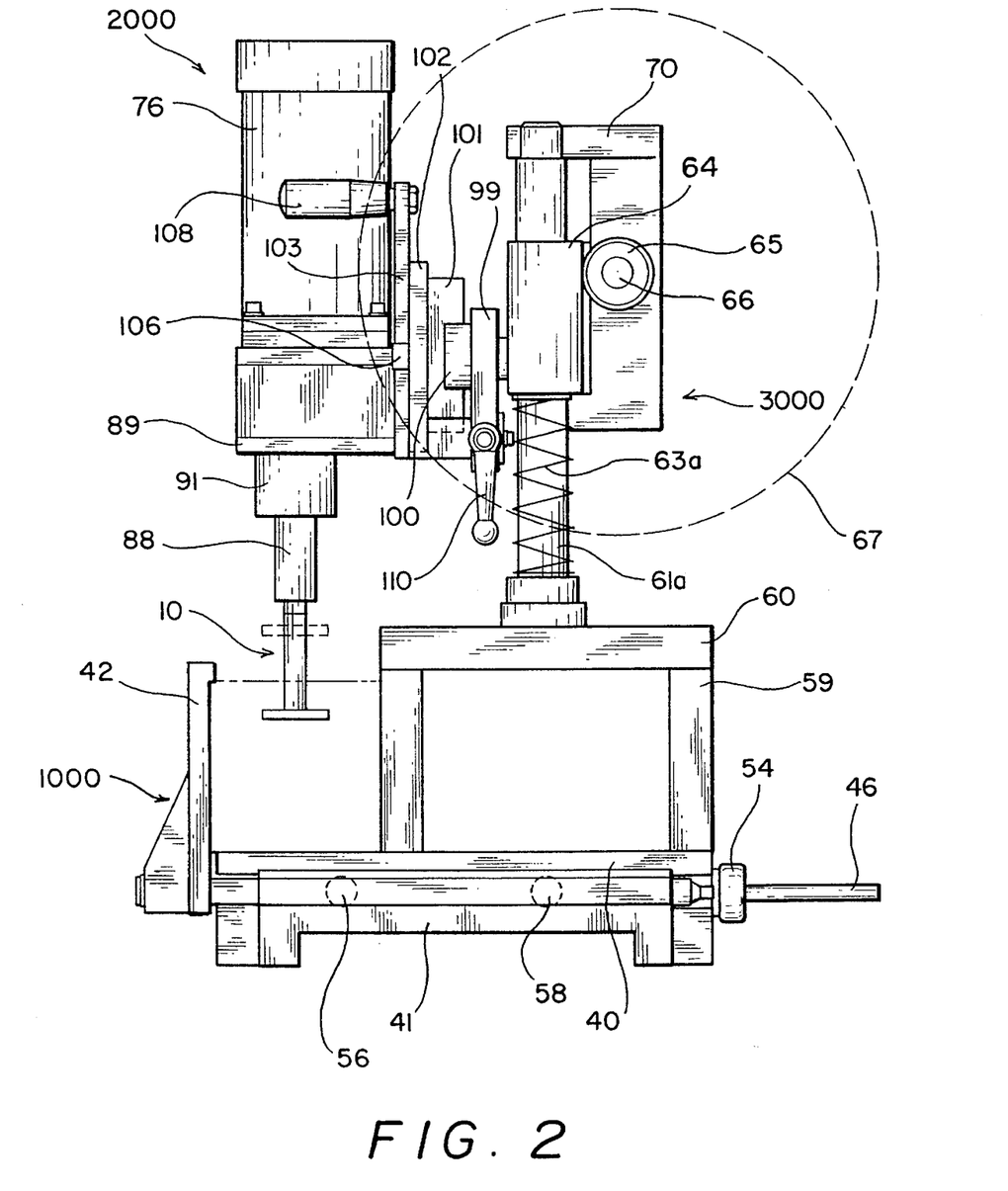
FIG. 2 is a side elevational view of the drilling/cutting machine as indicated by arrow A in FIG. 1.

Alternatively, in order to make the joints in the wooden member in a crosswise direction, the shafts 44, 46 are inserted into corresponding holes 56, 58, as shown in FIG. 2. When the shafts 44 and 46 are inserted in this direction, the clamping plate 42 is parallel relative to the left side of the bed 40.

The mechanism 3000 is supported by the following structure in the embodiment shown. However, other suitable structures can be provided for supporting the mechanism 3000 on the bed 40. This embodiment includes a pair of vertical support 59 supported by bed 40. An upper base 60 located parallel relative to the lower base 41 is supported by the vertical support 59.

The mechanism 3000 includes means for raising and lowering the drilling/cutting tool 2000. The mechanism includes two (2) vertical shafts 61a, 61b extending upwardly from the upper base 60. A top connector plate 70 is installed on top of the vertical shafts 61a, 61b to secure the ends thereof. A moveable support unit 62 is positioned midway on the vertical shafts 61a, 61b so that the moveable support unit 62 can be raised or lowered. Springs 63a, 63b (one shown in FIG. 2) are inserted around the vertical shafts 61a, 61b, and located below the moveable support unit 62 for resiliently supporting the same. The springs 63a, 63b force the moveable support unit 62 upwardly.

The mechanism 3000 includes means for moving the drilling/cutting tool back-and-forth (e.g. horizontally). The mechanism 3000 includes a vertical rack 64 supported at its center on the moveable support unit 62. A spur gear 65 fixed on an axial pinion 66 is geared to vertical rack 64. A handle 67 is connected to one end of the axial pinion 66. The axial pinion 66 is supported by two needle bearings 68 and 69 to be horizontally rotatable. Thus, by turning the handle 67, rotation of the axial pinion 66 is supported by the needle bearings 68, 69. At the same time, accompanied by the rotation of the spur gear 65, the vertical rack 64 goes up and down within the allowable limits. The moveable support unit 62 goes up and down by the movement of the vertical rack 64.

The moveable support unit 62 can be locked by the clamping lever 74. The handle 67 cannot be turned if the moveable support unit is locked. Thus, the position of the moveable support unit 62 can be securely locked.

In this embodiment, the device to raise and lower the moveable support unit 62 on the vertical shafts 61a, 61b includes the vertical rack 64, the spur gear 65, the axial pinion 66, and the handle 67.

The drilling/cutting tool 2000 is supported by mechanism 3000 for movement in both vertical and horizontal directions. The drilling/cutting tool 2000 includes a motor 76 installed to move relative to the moveable support unit 62. A driving pulley 80 is fixed on a shaft axis 78 of the motor 76. On both side of the driving pulley 80, driven pulleys 82 and 84, which has a radius larger than the driving pulley 80, are placed side by side. The driven pulleys 82 and 84 are fixed on the shafts 86, 88.

A drilling/cutting bit 10 is set on each shaft 86, 88. The shafts 86, 88 are supported rotatable by bearings 92, 93, which are installed in housings 90, 91. The housings 90, 91 are fixed on a housing plate 89. U-shaped clips 94, 96 are fixed between the bearing 93 and driven pulley 84 and between the bearing 92 and driven pulley 82 of the principal axes. The shafts 86, 88 are supported by these U-shaped clips 94, 96 and the bearing 92, 93.

As shown in FIG. 1, timing belt 97 is hooked on the three driving pulley 80 and driven pulleys 82, 84. Rotation of the motor 76 is transmitted through the driving pulley 80 by the timing belt 97 to the driven pulleys 82, 84. Thus, the driven pulleys 82, 84 turn in the direction of the motor 76. The rotating driving device to rotate the shafts 86, 88 is organized with the motor 76, the driving pulley 80 and driven pulleys 82, 84, and the timing belt 97. Thus, the drilling/cutting bit 10 turns in the same direction of the motor 76.

The motor 76, the driving pulley 80 and driven pulleys 82, 84, and the shafts 86, 88 can be moved to both the left and right directions in the FIG. 3. Two transverse horizontal support shafts 98a, 98b protrude horizontally from the moveable support unit 62. A bracket 99 is fixed at the end of the transverse horizontal support shafts 98a, 98b. An inner sliding rail 100 is attached horizontally to the bracket 99. An outer slide 101 slides on an inner sliding rail 100. The outer slide 101 is fixed to the support plate 102, which is installed on the side of the motor 76. The support plate 102 and the outer slide 101 move as a single unit.

One end 104 of a lever 103 is fixed on the bracket 99. The lever 103 can slide to both the left and right directions within a limited set angle, as shown in FIG. 3 with a double dotted line. The edge of the support plate 102 is connected to the lever 103 through a cam follower 106, and a grip 108 is installed on the other side of the lever 103. Thus, moving the lever 103 left and right by holding the grip 108, accompanied by the movement of the lever 103, the support plate 102 with the outer slide 101 riding on the inner sliding rail 100 by the motor 76, and the shafts 86, 88 can be moved sideways.

The side direction of the shafts 86, 88 can be fixed by locking the lever 103 at the appointed place with the clamping lever 110. Moreover, in FIG. 1, left side movement of the support plate 102 is stopped by a stop bolt 112 which is fixed with a stop 111 at the left end of the bracket 99. The place where the support plate 102 meets the stop bolt 112 is the limit of movement to the left end.

The drill/cutting tool primarily comprises a shank 1, body 2, and end cutting blade 3, as shown in FIGS. 4–7. A neck 4 may be provided between the shank 1 and body 2 as illustrated. The shank 1, neck 4, body 2, and end cutting blade 3 are attached in continuous manner.

Figure 5:
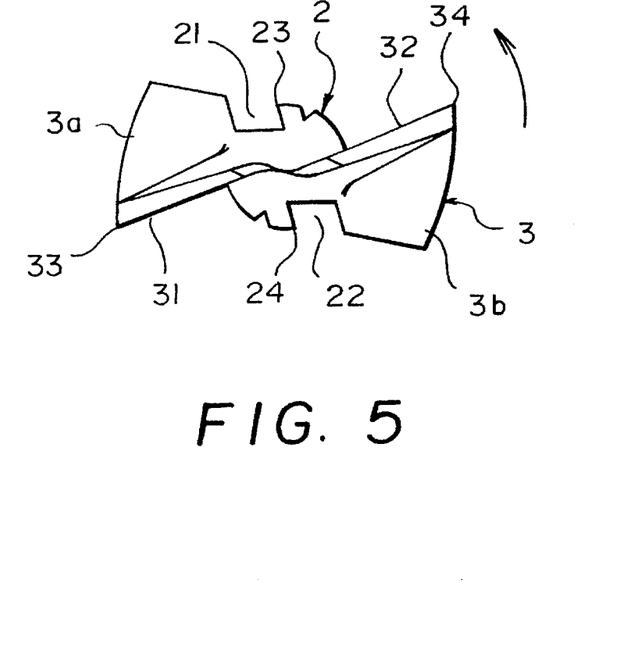
FIG. 5 is a bottom planar view of the drill/cutting bit as shown in FIG. 4.

The body 2 is provided with a pair of opposed primary grooves 21 and 2, as shown in FIG. 5, which extend in the longitudinal direction of the body 2. In this preferred embodiment, the primary grooves 21 and 22 are straight. Alternatively, the primary grooves 21 and 22 can have other shapes such as a helix, however, the straight primary grooves 21 and 22 tend to cut the fastest in the method according to the present invention.

Figure 6:
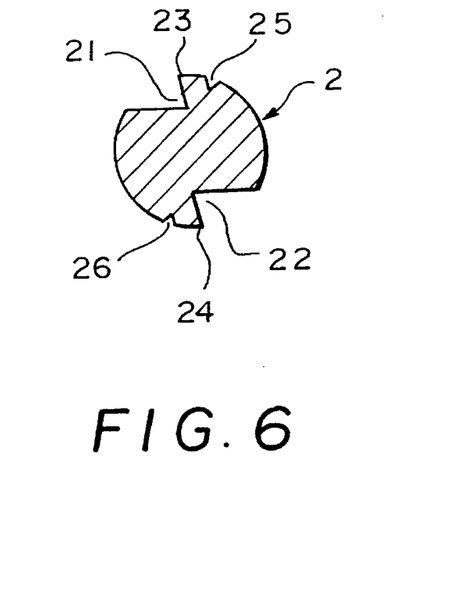
FIG. 6 is a cross-sectional view through the shank of the drill/cutting tool as shown in FIG. 4.
Figure 7:
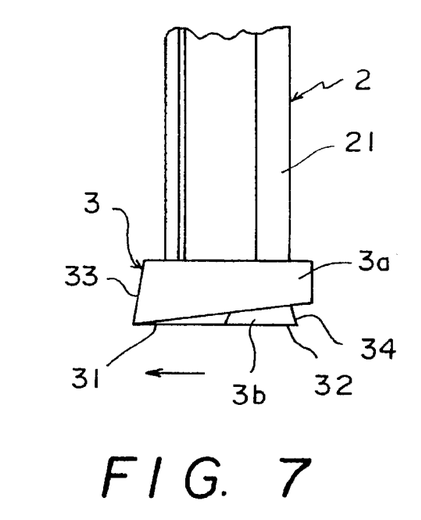
FIG. 7 is a detailed partial side view of the drill/cutting bit as shown in FIG. 4.

The trailing edges of the primary grooves 21 and 22, relative to the direction of rotation, define cutting edges 23 and 24, respectively, as shown in FIG. 6. The body 2 is also provided with opposed secondary grooves 25 and 26. The secondary grooves 25 and 26 are both smaller in width and depth relative to the primary grooves 21 and 22. Further, the secondary grooves 25 and 26 are provided in a trailing position relative to the cutting edges 23 and 24, respectively, to reduce cutting friction.

The end cutting blade 3 comprises a pair of opposed cutting blades 3a and 3b having the shapes as shown in FIG. 5. The cutting blades 3a and 3b are provided with side cutting edges 33 and 34, respectively. The cutting blades 3a, 3b are constructed symmetrically and located apart at a 180 degree angle from a center axis of symmetry of the body 2.

The cutting blades 3a and 3b are also provided with bottom cutting edges 31 and 32 located on leading edges of the cutting blades 3a and 3b relative to the direction of rotation (i.e direction of arrow).

The diameter of the body 2 dictates the width of the slots 300b and 300c cut extending from holes 300a, as shown in FIG. 11. The diameter of the end cutting blade 3 dictates the width of the slots 300c. The thickness of the end cutting blade dictates the depth of the slots 300c, and are approximately equal to the thickness of the end plates 205 and 206 of the metal plate connector A, as shown in FIG. 8.

The drill/cutting bit according to the present invention is not limited to the preferred embodiment disclosed in detail above. For example, in above practice, the body 2 can be provided with three or more primary grooves providing three or more cutting edges on the body 2. As mentioned above, the primary grooves may be spiral providing two or more spiral cutting edges. Maximum cutting capacity can be achieved with more than three primary grooves having straight, spiral or other shapes.

The end cutting blade 3 can be provided with more than two blades. For example, four to fifteen blades are preferable considering the cutting capacity.

Operation of the said drilling/cutting machine is as follows:

1 1. Set the above constructed drilling/cutting bit 10 on the shafts 86, 88 of the machine.

2. Set the wooden member (not shown) on the bed 40. In case of drilling the joints in the lengthwise direction (FIG. 11), set the clamping plate 42 and the shafts 44, 46 in the way it is shown in FIG. 1. In this case, the wooden member is held to the direction shown by two dotted lines with the width of X. In case of drilling the holes in the crosswise direction (FIG. 12), set the shafts 44, 46 and the clamping plate 42 to the walls opposite each other of the bed 40. In this case, the wooden member is held to the direction shown by two dotted chain lines of width of Y. In addition, in the "metal fit method" standard size sets of joints are made either in lengthwise direction or crosswise direction. For example, in FIG. 1, drilling holes in lengthwise direction the width X of the wood member is set to 103 mm. Drilling the holes in crosswise direction, the width Y of the wood member is set to 240 mm. Therefore, it is preferable to set the measurement of the bed 40 and such beforehand according to the standard size in order to drill these set sized wood members.

3. After setting the wooden member, turn the switch of the machine to turn on the motor 76.

4. Drive the clamping lever 74. Unlock the lock of the moveable support unit 62. Turn the handle 67 to lower the shafts 86, 88 which means to lower the drill 10. As it is already explained, this lowering is caused as follows: First, the axial pinion 66 turns as the handle 67 turns. Then, the spur gear 65 which is attached to the axial pinion 66 turns. By the turning of the spur gear 65, vertical rack 64 descends. Lastly, the moveable support unit 62 descends along with vertical shafts 61a, 61b.

5. Lower the spinning drilling/cutting bit 10 by the handle 67. Now the wooden member is drilled in circular shape by the cutting blades 33, 34 formed on the peripheral surface and the cutting blades 31, 32 formed on the lower surface of the cutter 3a, 3b. By drilling to the depth which the protrusions of the metal plate connecter A can be inserted all the way, the cylinder shaped hole (a) with the set diameter is formed.

6. At the time of the completion of the hole 300a, lock the moveable support unit 62 by the clamping lever 74 to keep the depth of the drilling/cutting bit 10 in the wood member.

7. Slide the drilling/cutting bit 10 parallel and horizontally relative to the wooden member. To do this, drive the clamping lever 110 to unlock the lock of the lever 103. After unlocking it, by the turning of the grip 108, move the lever 103 left and right (FIG. 3).

8. By the lever 103, the support plate 102 is pulled. Then the outer slide 101 slides to the right on the inner sliding rail 100. This movement makes the shafts 86, 88, which means the drill 100 moves to the right (Shown in the FIG. 3 with double dotted line).

9. By the above movement, the cutting blades 23, 24 of the body 2 cut the slots 300b. At the same time, the slot 300c is formed by the side cutting edge 33 of the end cutting blade 3. Move the drill horizontally sideways to a distance greater than the dimensions of the end plate 205 and 206 of the metal plate connector A the ensure a strong joint construction. Now the slots 300b with the set width and set length and the slots 300c with the set width and the height are completed.

10. After completing the drilling of the joints, move the lever 103 horizontally sideways to move back the drilling/cutting bit 10 to the previous position. By the handle 67, lift the drill 10. Then turn off the switch to stop the motor 76, at the same time, lock the moveable support unit 62 and the lever 103 by the clamping levers 74, 110 as occasion demands.

As explained, by using the drilling/cutting machine according to the present invention, it is possible to form two joints to insert one metal plate connector A with one drilling process. Thus, the drilling operation becomes highly efficient. Moreover, the drilling machine need not to be large nor heavy relative to the size and weight of the wooden members to be drilled, thus making it possible to make the machine portable. In such case, the machine can be used not only in a plant but also in the field.

Of course, the invention is not limited to the machine explained above. For example, the preferred embodiment has two axes, however, it is possible to have one axis or three or more axes according to the number of joints to be formed.

As explained above, the machine according to the present invention makes it easy and requires less time to make joints to insert at least two protrusions of a metal plate connector used to join wooden members together by making the drilling process highly efficient.

In addition, the drilling/cutting machine includes a device for clamping wooden members on the base of the machine. The clamping device is made to be removable. Thus, wooden members are easily clamped and unclamped onto the base by the clamping plate 42 according to the standardized size of the wooden member. This clamping device provides not only clamping the wood member tightly and securely, but allows the orientation of the wooden member to be varied so that it is possible to have holes drilled either lengthwise or crosswise in the wooden member.

What is claimed is:

1. A drilling/cutting machine for making joints in wooden members for accepting metal protrusions of a metal plate connector used to join wooden members together, said machine comprising:

a bed for holding the wooden member;

a drilling/cutting tool connected to said bed, said drilling/cutting tool having a drilling bit configured for boring a hole into a surface of the wooden member when said drilling/cutting tool is moved along a first axis towards said bed and configured for cutting at least one slot extending from the hole in the surface of the wooden member when said drilling/cutting tool is subsequently moved along another axis set substantially perpendicular relative to said first axis; and a mechanism connected between said bed and said drilling/cutting tool, said mechanism configured for moving said drilling/cutting tool along said first axis towards and away from said bed, and configured for moving said drilling/cutting tool along said second axis along the surface of the wooden member.

2. A drilling/cutting machine according to claim 1, wherein said drilling bit, comprises:

a shank;

a body connected to said shank, said shank having at least one primary groove extending along a longitudinal direction of said shank;

a body cutting blade positioned along said shank; and an end cutting blade positioned at an end of said body, said end cutting blade having a greater diameter relative to said body cutting blade.

3. A drilling/cutting machine according to claim 1, including an adjustable clamping device for accommodating different width wooden members.

4. A drilling/cutting machine according to claim 1, including another drilling/cutting tool positioned adjacent to said drilling/cutting tool and aligned in a direction along the length of the wooden member.

5. A drill/cutting machine according to claim 4, wherein said drilling/cutting tools are set apart a predetermined distance equal to the spacing between protrusions on the metal plate connector.

6. A drill according to claim 2, wherein said body is provided with a pair of opposed primary grooves, and said body cutting blade is defined by trailing cutting edges of said primary grooves.

7. A drill according to claim 1, wherein said end cutting blade is defined by a pair of opposed cutting members.

8. A drill according to claim 6, wherein said opposed cutting members provide a continuous cutting edge.

9. A drill according to claim 8, wherein said continuous cutting edge is defined by a pair of straight opposed parallel cutting edges transitioning at a center of said continuous cutting edge.

10. A drill according to claim 6, wherein said end cutting blade is defined by a pair of opposed cutting members.

11. A drill according to claim 1, wherein said body is provided with a secondary groove for reducing friction during cutting.

12. A drill according to claim 10, wherein said secondary grooved is more shallow than said primary groove.

13. A drill according to claim 11, wherein said primary groove is defined by a pair of opposed grooves, and said secondary groove is defined by a pair of opposed grooves positioned in a trailing position, respectively, relative to said primary grooves.

14. A drill according to claim 1, wherein said end cutting blade is define by a side cutting edge for cutting transversely, and a bottom cutting edge for boring.

* * * * *